Figures 1, 2, 3:
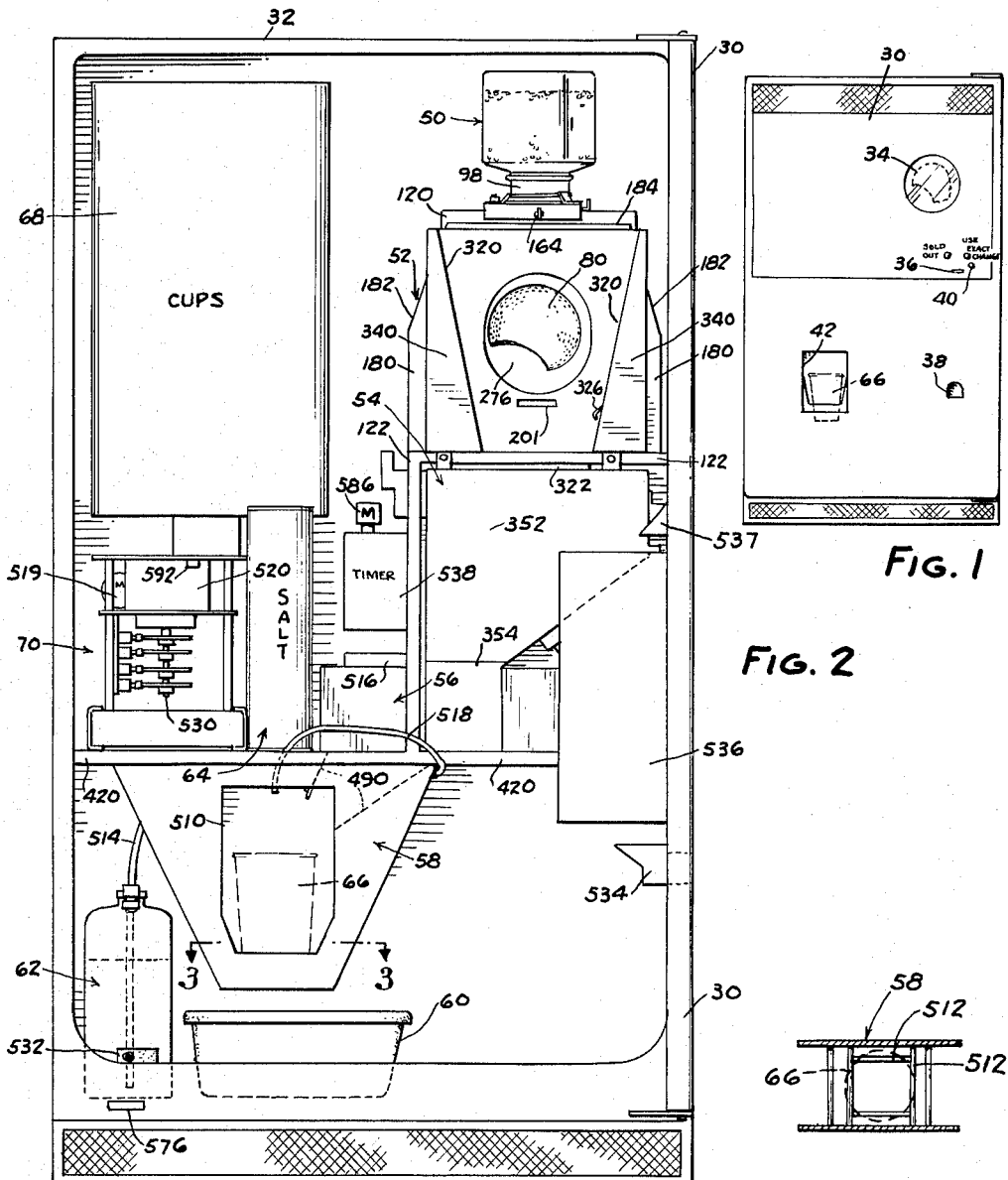

May 31, 1966  J. P. JONES  3,253,532
POPCORN VENDING MACHINE
Filed June 26, 1963  10 Sheets-Sheet 1

INVENTOR.
JOHN PAUL JONES
BY
Barnes, Kisselle, Raisch & Choate
ATTORNEYS

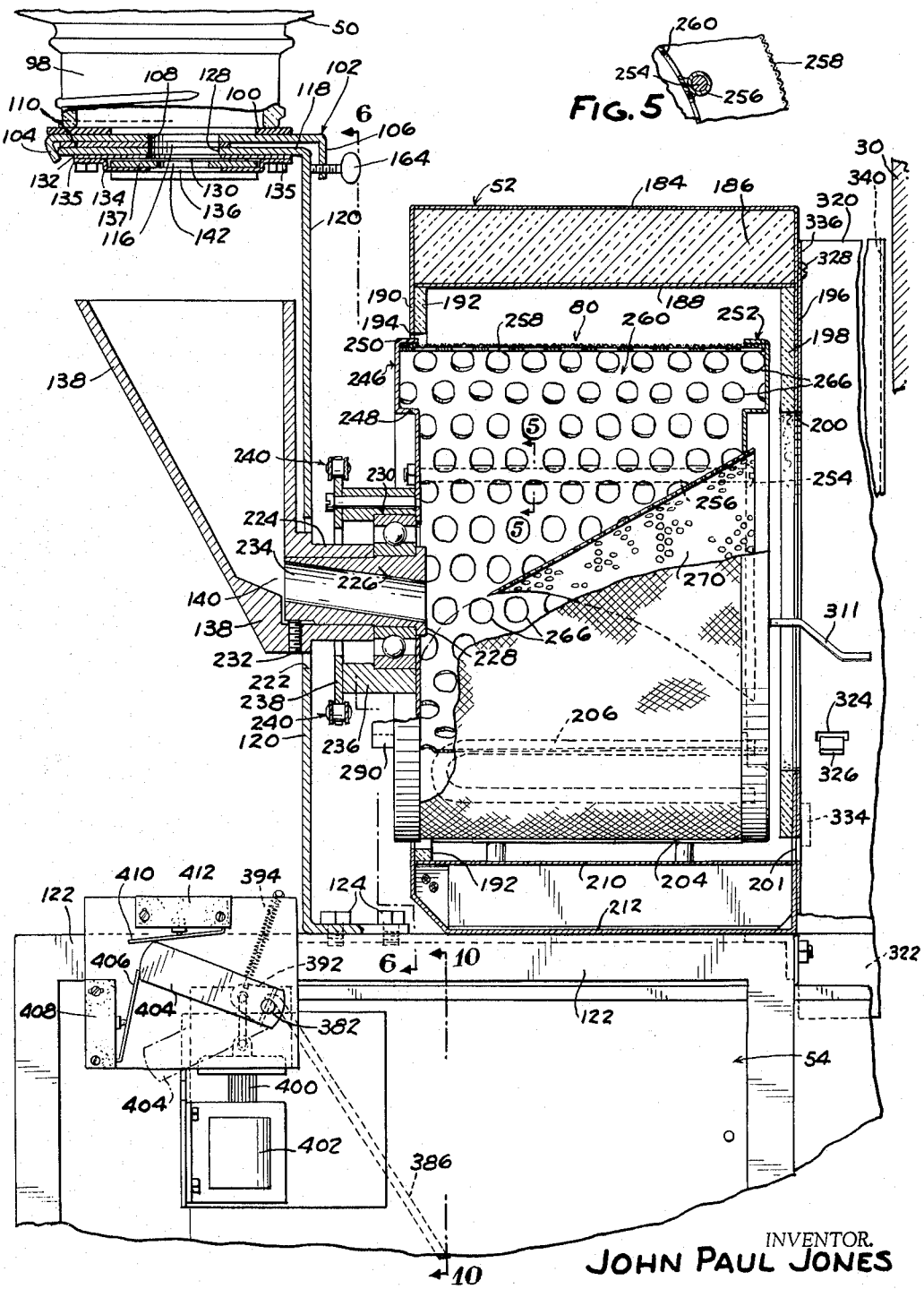

INVENTOR.
JOHN PAUL JONES

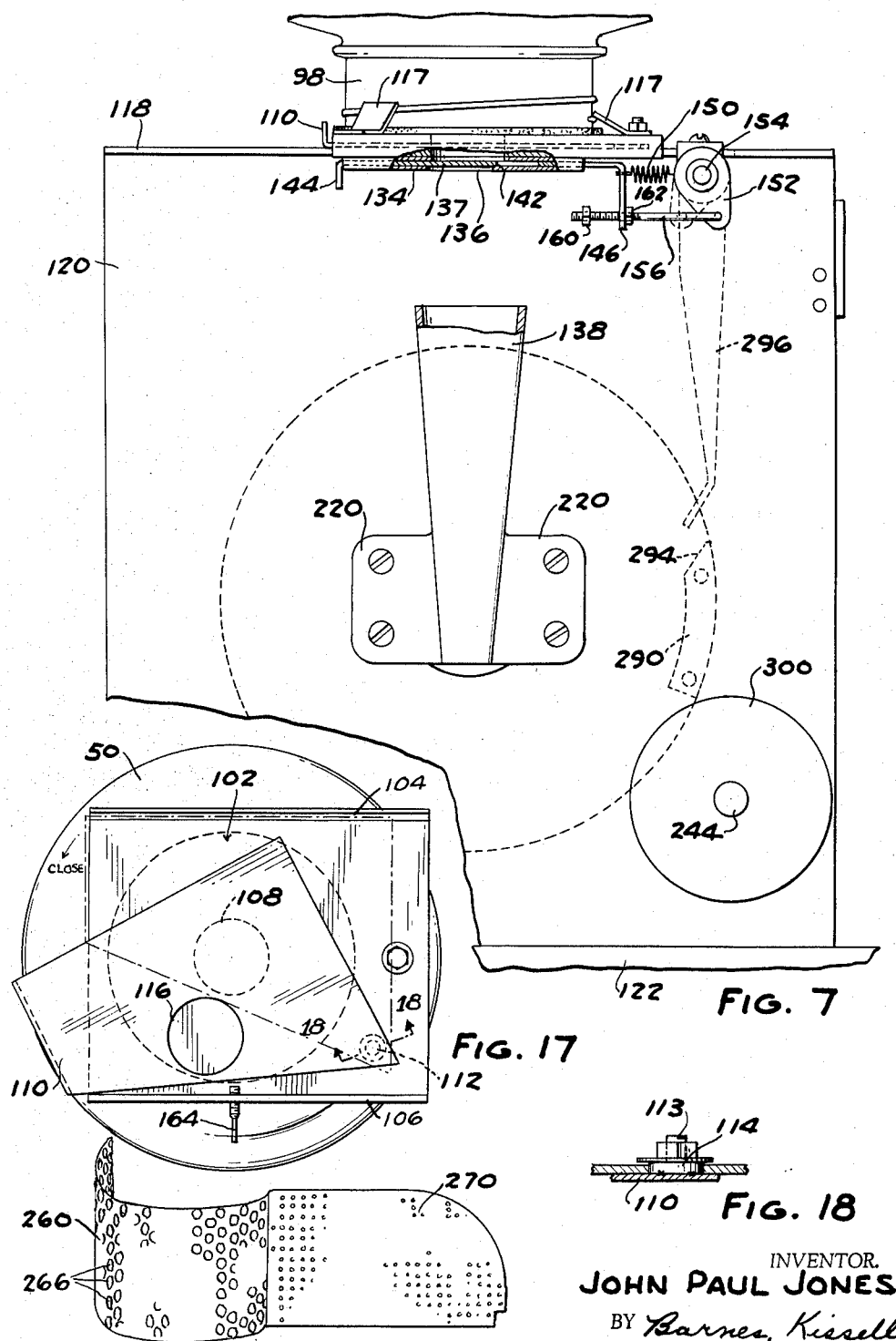

May 31, 1966 J. P. JONES 3,253,532
POPCORN VENDING MACHINE
Filed June 26, 1963 10 Sheets-Sheet 5

INVENTOR.
JOHN PAUL JONES
BY Barnes, Kisselle,
Raisch & Choate
ATTORNEYS

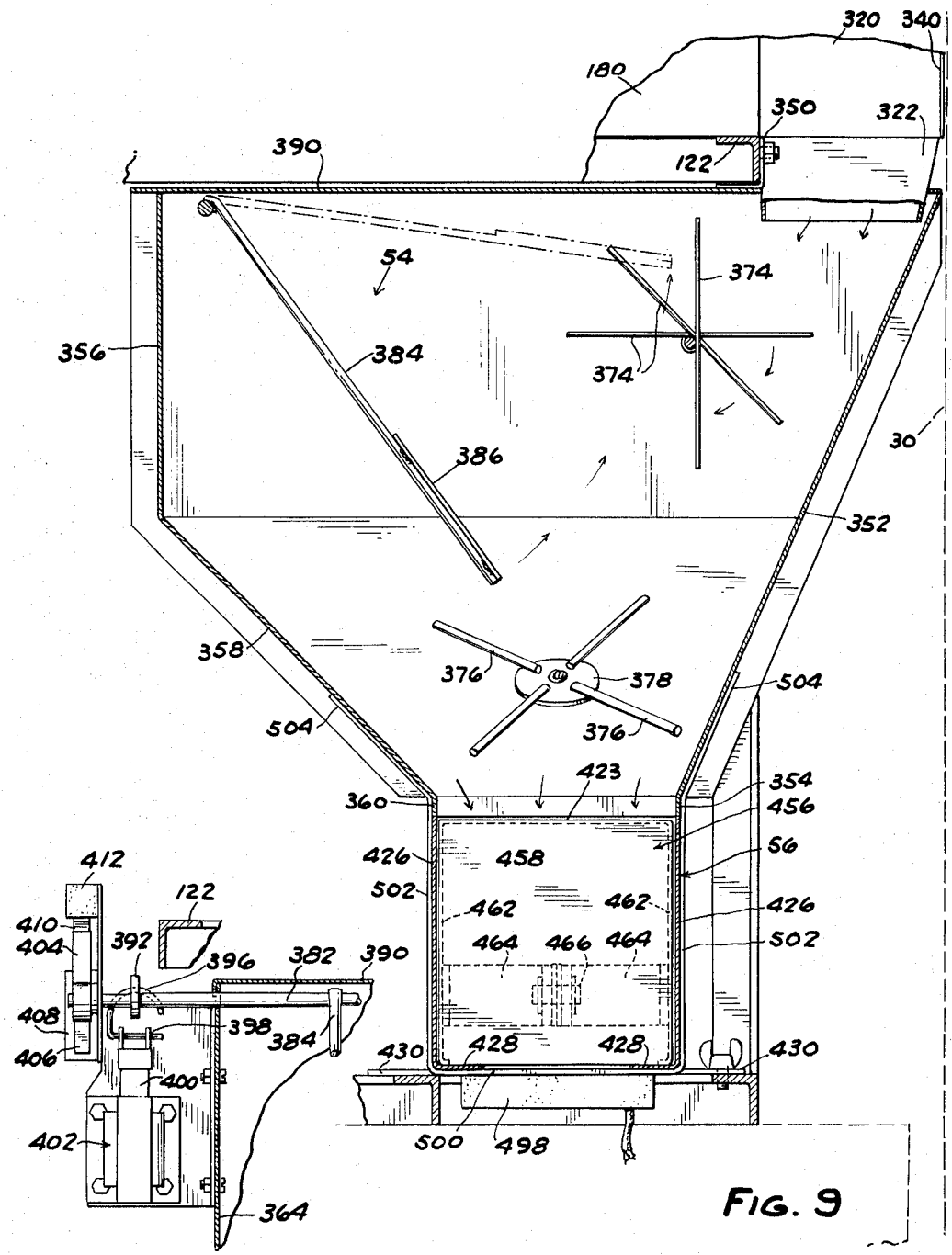

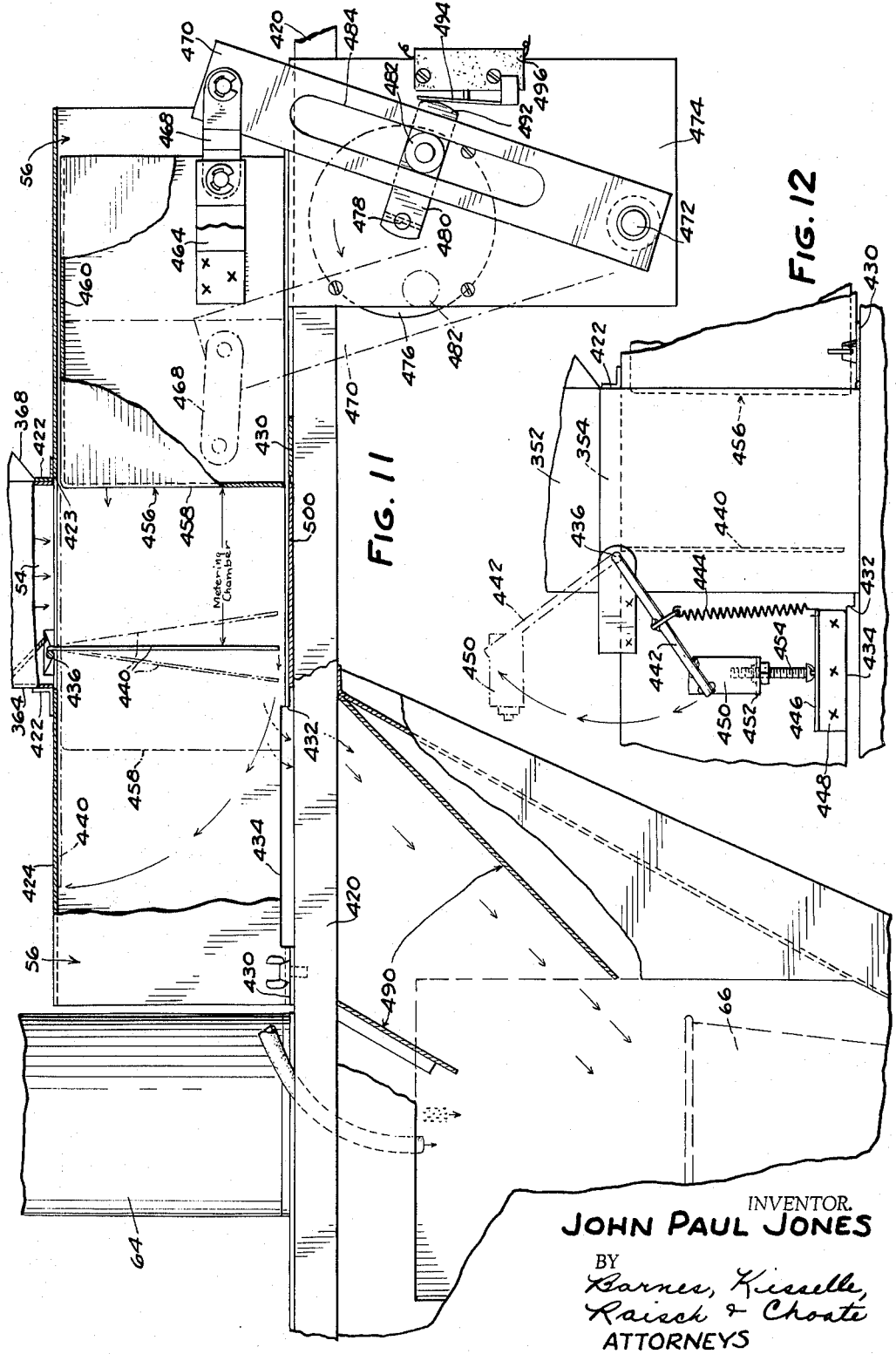

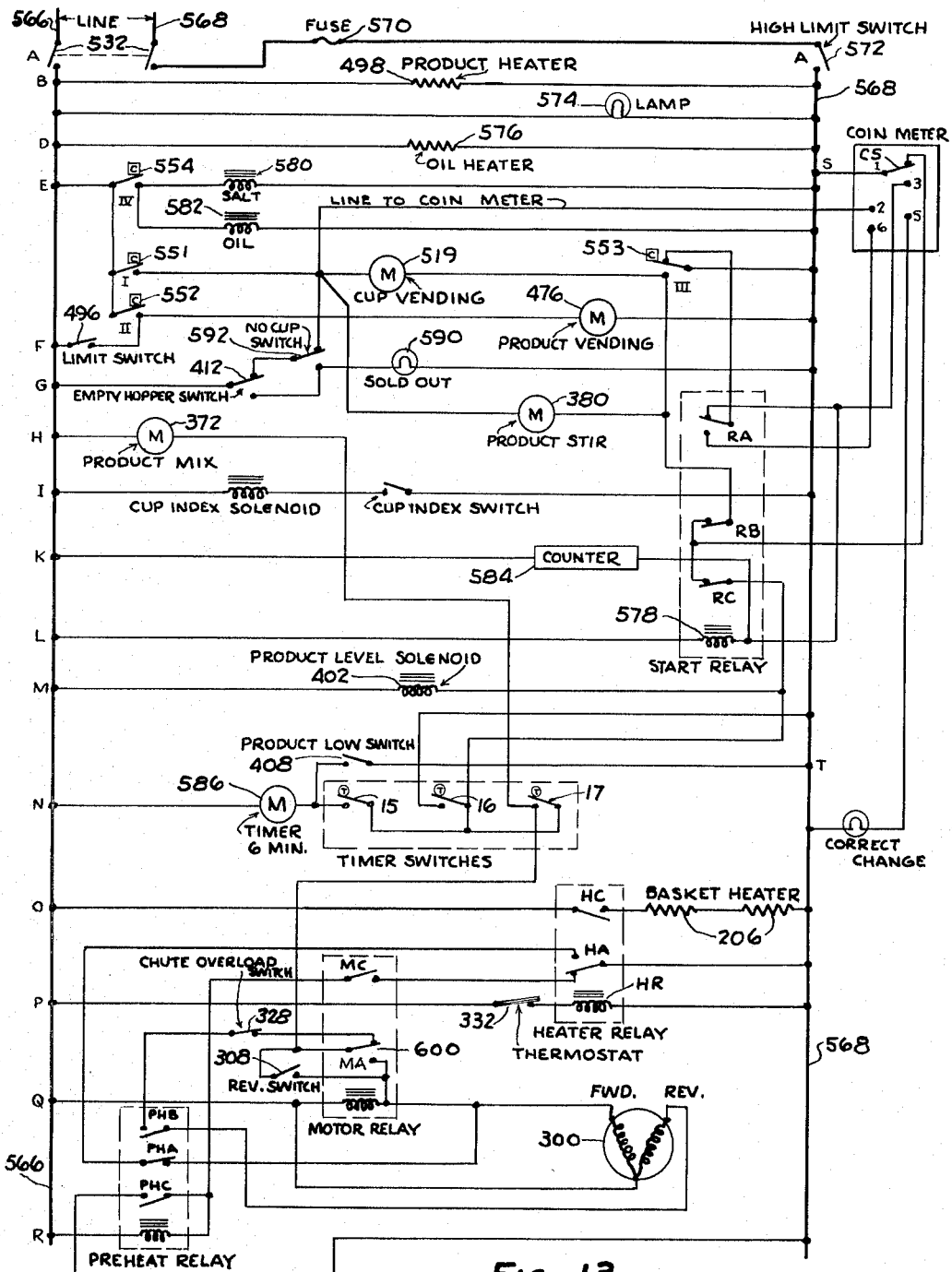

INVENTOR.
JOHN PAUL JONES
BY
Barnes, Kisselle, Raisch & Choate
ATTORNEYS

May 31, 1966  J. P. JONES  3,253,532
POPCORN VENDING MACHINE
Filed June 26, 1963  10 Sheets-Sheet 10

INVENTOR.
JOHN PAUL JONES
BY
Barnes, Kisselle, Raisch & Choate
ATTORNEYS

United States Patent Office 3,253,532
Patented May 31, 1966

3,253,532
POPCORN VENDING MACHINE
John Paul Jones, Adrian, Mich., assignor to H. W. Tuttle & Company, Tecumseh, Mich., a corporation of Michigan
Filed June 26, 1963, Ser. No. 290,682
11 Claims. (Cl. 99—238.3)

This invention relates to an automatic popcorn popping and dispensing machine and has for its primary object a coin-operated machine wherein a predetermined amount of popcorn will be dispensed with suitable seasoning upon the insertion of a coin in the machine.

It is also an object to provide an apparatus and electrical controlling circuit which will maintain a certain supply of properly heated popped corn ready for dispensing.

It is a further object to provide a machine which has a novel heating arrangement to make it safe in its operation against any danger of fire and which also meets all sanitary requirements for the proper handling of food to be consumed by humans. It is thus a feature of the device that it can be readily cleaned and serviced to maintain it in proper condition.

It is another object to provide a coin-operated machine which will maintain a reasonably steady flow of popped corn even under high demand conditions and which is completely automatic in a replenishment cycle.

Another object of the invention is the provision of a proper heating arrangement which assures adequate heat for popping of corn but which also is sufficiently controlled that, even in the event that the corn carrying element of the machine is stopped in the midst of a popping cycle, the corn, whether popped or unpopped, will not be heated to the point that it will smoke or burn. It would be recognized that this type of machine must be in public buildings and in many cases operating without any immediate supervision apart from occasional visits by a serviceman. Thus, it must be completely safe in its operation and must not only be fireproof but smokeproof to avoid any panic in crowds using the area. This is accomplished by an oven-type of heating arrangement wherein heat normally is directed to corn being popped but in the event of a stoppage of a corn carrying basket, the heat will be dissipated up through the top of the machine and adequately controlled by thermostats which will prevent any excessive heating.

It is a further object to provide a popcorn dispensing machine which has an automatic level control for popped corn which will regulate the popping apparatus, a metering device for the charge of unpopped corn delivered to the oven, a pre-heat control circuit to prevent operation at sub-normal temperatures, and positive vend devices to insure adequate and metered quantities of popcorn being delivered to a customer.

Another feature relates to the storage and delivery of the unpopped corn supply to obtain a metered supply of unpopped corn in proper condition for popping.

Other features relate to circuitry which times the operation and causes repeat cycles when necessary to replenish the popped corn.

Numerous additional objects and features of the invention will be apparent in the following description and claims.

Drawings accompany the disclosure and the various views thereof may be briefly described as:

FIGURE 1, a front elevation of the machine.

FIGURE 2, a front elevation of the machine with the front door opened.

FIGURE 3, a sectional view of the discharge hopper on line 3—3 of FIGURE 2.

FIGURE 4, a vertical section of the machine showing portions of the supply chute for the unpopped corn and a portion of the rotating basket oven in section.

FIGURE 5, a small sectional view on line 5—5 of FIGURE 4 showing a portion of the rotating basket.

Figure 6:
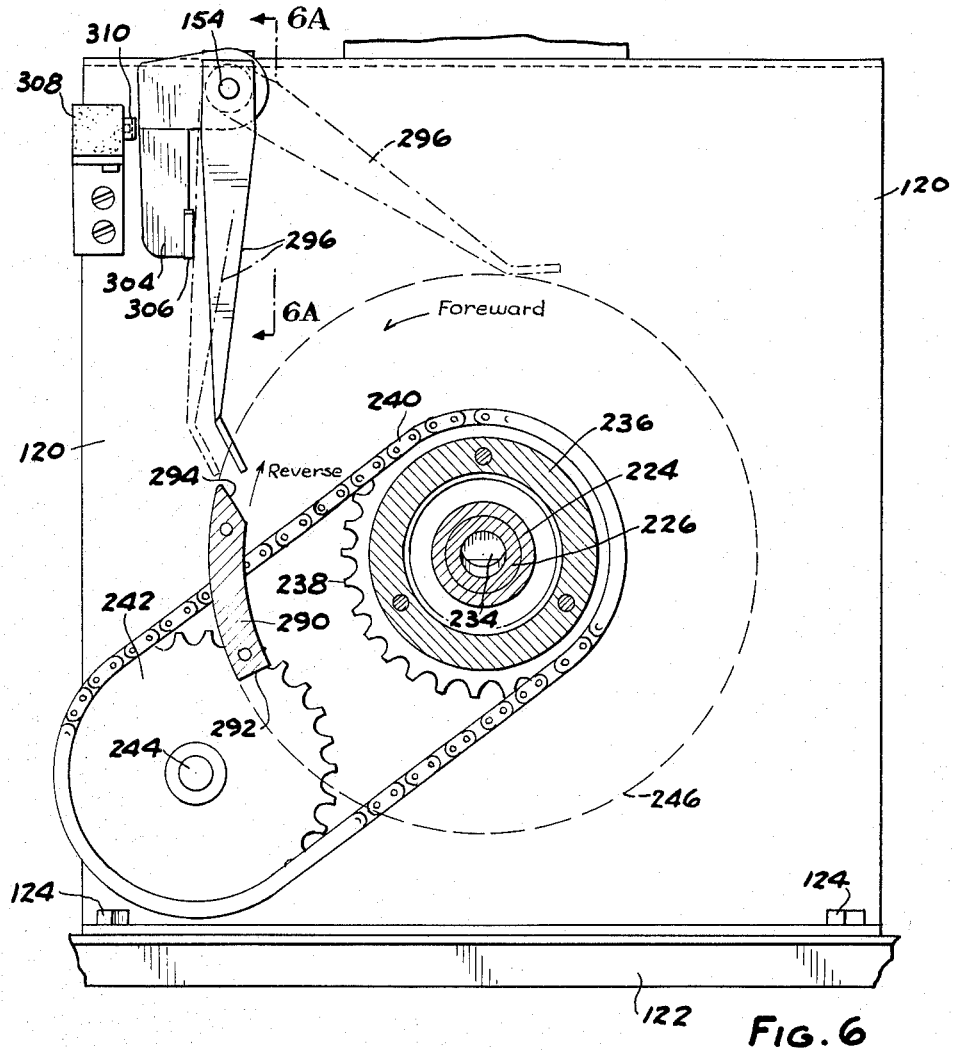

FIGURE 6, a sectional view on line 6—6 of FIGURE 4 illustrating a basket control mechanism.

Figure 6A:
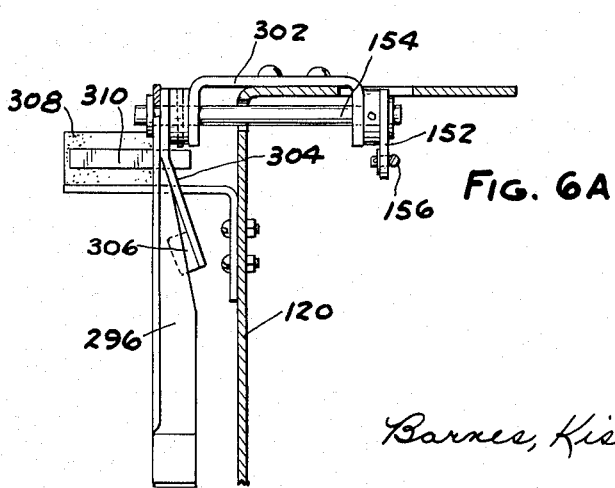

FIGURE 6A, a sectional view of a portion of the control mechanism on line 6A—6A of FIGURE 6.

FIGURE 7, a view of the rear of the basket oven with a portion of the support broken away.

Figure 8:
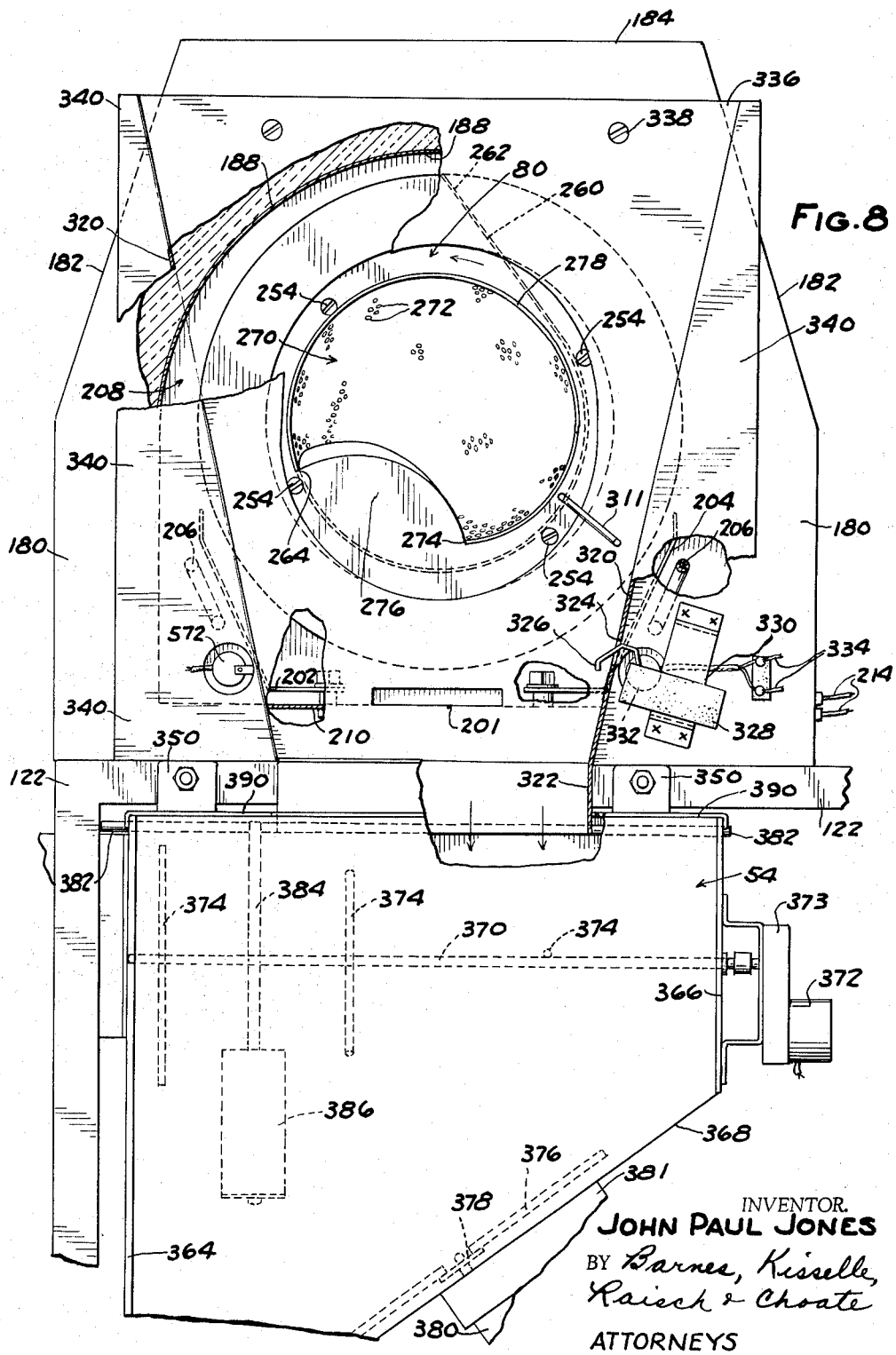

FIGURE 8, a view of the delivery chutes and product hopper showing also a front portion of the rotating basket oven.

FIGURE 9, a front-to-back vertical section of the product hopper.

FIGURE 10, a sectional view on line 10—10 of FIGURE 4 illustrating a rear view of a control mechanism for product conditioned signaling devices.

FIGURE 11, a front-to-back vertical section of the metering and vending passages of the machine.

FIGURE 12, a partial view of a control mechanism for the quantity adjustment portion of the vending system.

FIGURE 13, a diagrammatical view of the electrical control circuit.

Figure 14:
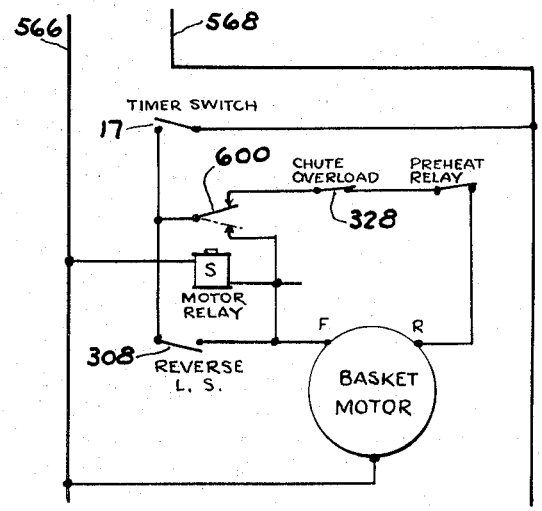

FIGURE 14, a diagrammatical view of the basket motor circuit control.

Figure 15:
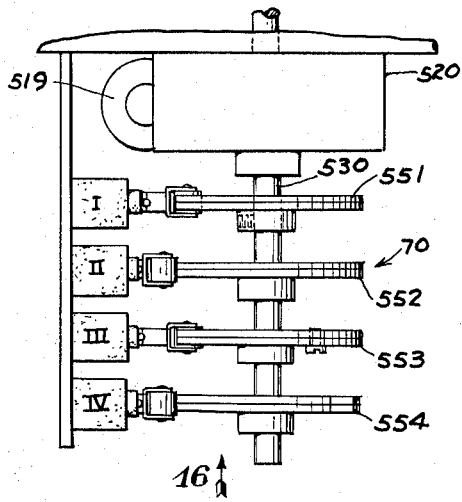

FIGURE 15, a view of the cam control mechanism operated by a shaft of a cup dispenser unit.

Figure 16:
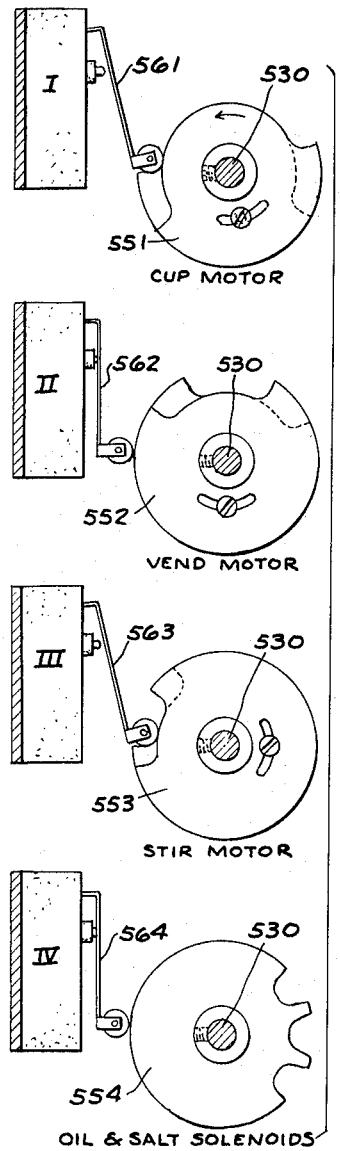

FIGURE 16, an exploded view of the cam control mechanism to illustrate the functions of the cams.

FIGURE 17, a bottom view of a storage container support for unpopped corn.

FIGURE 18, a small sectional view on line 18—18 of FIGURE 17.

FIGURE 19, a layout of basket element.

Figure 20:
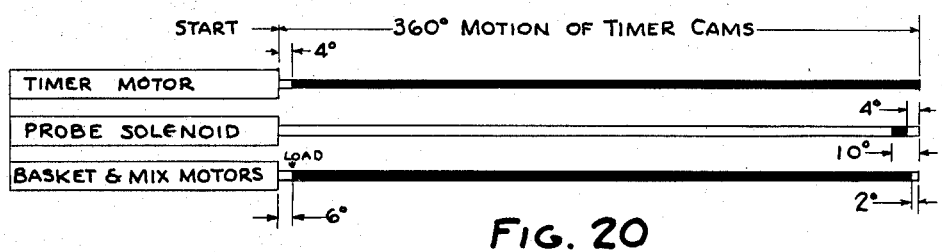

FIGURE 20, a time layout for normal cycle.

Figure 21:
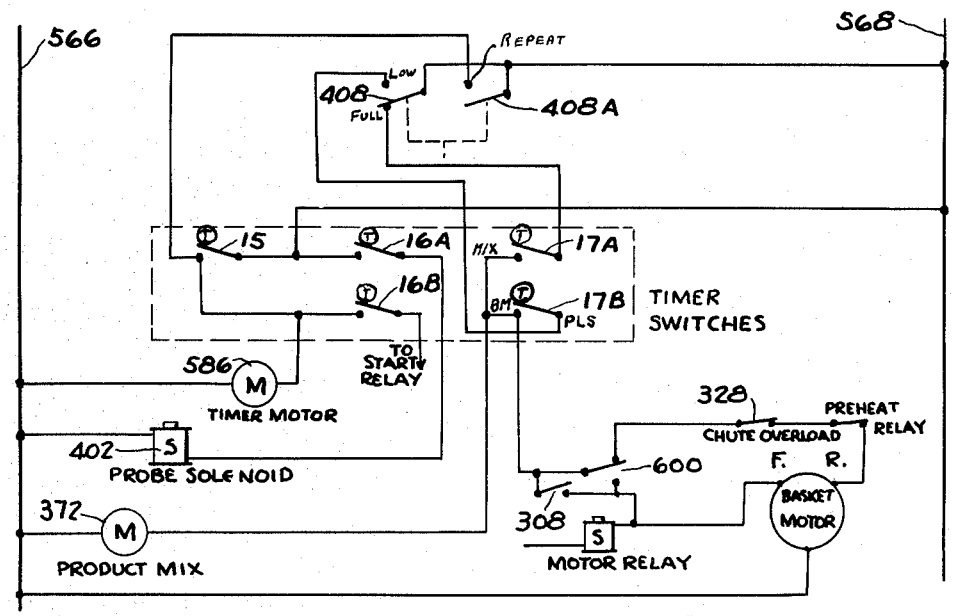

FIGURE 21, a modified portion of the circuit of FIGURE 13 to achieve an alternate repeat load cycle and basket motion on each coin deposit.

Figure 22:
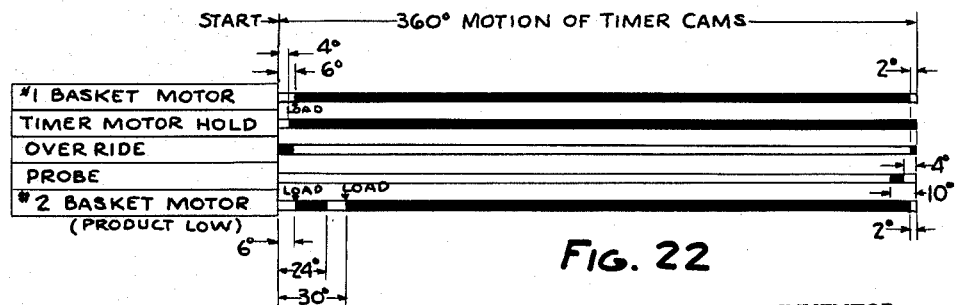

FIGURE 22, a modified time layout for the repeat timer cycle.

*Brief description of basic elements and fundamental operation thereof*

Referring to the drawings, the device is illustrated in FIGURE 1 as a vertical cabinet having a door panel 30 and a frame portion 32. As shown in FIGURE 2, the device as actually constructed is about the size of a floor model refrigerator. The door has a center 34 which permits a viewing of the rotating popping hopper, and it also has a coin slot 36 with suitable indicia lines to indicate "Sold Out," "Use Exact Change," and so on. As is customary with coin-operated devices, the door would have a coin return slot 38 and a push-botton 40 for coin return. An opening 42 in the lower left portion of the door with a transparent slide cover provides space for removal of the filled cup. The mechanism for the coin operation is standard commercial structure which will not be described in detail.

*Brief summary of parts and operation*

Referring to FIGURE 2, the device is shown with the door open and the cabinet 32 includes a base, vertical sides and a top, together with a back panel and individual frame members which will be referenced below. The main elements of the combination are shown in FIGURE 2, as first, an unpopped corn hopper 50, an oven housing 52, a popped corn hopper 54 which delivers into a horizontal discharge chute 56 overlying in part a dispensing chamber 58 under which is a catch basket 60 for spilled corn. A liquid container 62 serves to hold the peanut oil or other liquid which is applied to the corn as it is dispensed. A salt container 64 is positioned above the dispensing station for the dispensing of salt to the corn as it feeds into the dispensing container 66. A cup storage device 68 is positioned at the upper right of the device for storage and dispensing of the cups 66 which will be used by the customers. Below the cup dispensing container is a series of cams 70 which are illustrated in detail in FIGURES 15 and 16.

With this broad view of the device, a brief description of the operation may be helpful before the parts are detailed. Unpopped corn in the hopper 50 will, in response to a predetermined reverse rotation of a rotating basket 80 within the oven 52, discharge a metered quantity of unpopped corn into this basket. Thermostatically controlled heat in the oven 52 will cause popping of this corn, and it will be discharged then into the hopper 54. It is fed from this hopper into the metering chute 56 and, in response to coin actuation, a metered quantity of the popped corn will pass down into a readied cup 66 and at the same time, the rotation of the cup dispensing device will actuate the cam set 70 to dump a plurality of charges of salt into the corn as it fills the cup 66 and also pump a predetermined quantity of heated oil from the container 62 into the newly discharged popped corn as it flows into the container 66. Once the container is filled, it can be removed by the purchaser.

*Unpopped corn storage and metered discharge*

In FIGURES 2, 7 and 17, the unpopped corn storage chamber 50 is shown in the form of an inverted bottle having a wide mouth 98. This bottle is sealed by an annular sealing grommet 100 which rests on a support plate 102 having a hook flange 104 at one end and a straight flange 106 at the other end. The plate 102 has a hole 108 which can be closed by a small closure plate 110 pivoted at 112 by a bolt 113 having a head 114 welded to the plate 110. A nut and washer hold the plate in position. The plate 110 has an opening 116 which can register with opening 108 after the assembly is installed.

Three tabs 117, one of which is releasable, hold the neck of the bottle to the plate 102. The plate 102 is supported on a horizontal flange 118 extending from a vertical plate 120 which is supported on a frame member 122 (FIGURE 4) adjacent the oven 52 by bolts 124. Flange 106 carries a thumb nut 164 which screws against plate 120 to lock this assembly in place.

As viewed in FIGURE 4, the apertures 108, 116 and 128 are aligned as will be the case when the storage bottle 50 is in place. Below the plate 118 a shuttle valve is located composed of an apertured plate 132 having an opening 130 and a plate 134 having raised side flanges 135 and an opening 136. These plates 132 and 134 serve as a guide recess for a shuttle valve plate 137 having an opening 142. This shuttle valve plate has a stop flange 144 at one end and an actuating flange 146 at the other end. A spring 150 serves to hold the shuttle valve plate 137 in position to the right as shown in FIGURE 7 so that the hole 142 is out of registry with the other aligned openings. This shuttle valve plate can be shifted bodily, however, by an arm 152 on a shaft 154 through a link 156 connected to the flange 146 depending from the plate 137. The stop tab 144 limits the right-hand movement of the shuttle plate. The link 156 has a slidable engagement with the flange 146 limited by the stop nuts 160 and 162. Thus, the arm 152 could rotate to the right as shown in FIGURE 7 without disturbing the shuttle plate but a left-hand rotation, that is, clockwise on shaft 154, would cause shifting of the plate 137 to align the hole 142 with the other apertures. These apertures are positioned directly above a hopper 138 having at the restricted bottom portion a side opening 140, this hopper member being suitably mounted on the plate 120 in a manner to be described later.

Thus, it will be seen that the storage bottle 50 is readily removable from the unit. This is accomplished by shifting the closure plate 110 to the position shown in FIGURE 17 so that the hole 108 is blocked and then by releasing the thumb nut 164 so that the entire assembly can be removed. Once the storage bottle 50 is filled with unpopped corn, it can be readily replaced by hooking flange 104 over the edge of plate 118 and tightening screw 164.

Now upon suitable actuation of shaft 154, which will be described later, the arm 152, through link 156, will shift the shuttle plate 137 to the left to bring the hole 142 into registry with holes 108, 116, 128 and 136. This will allow unpopped corn from the bottle 50 to flow directly into the hopper 138 where it will be passed into the rotating basket 80 within the heated oven 52 through a passage to be described in connection with the basket and oven. The quantity of corn will be limited by the time during which the shuttle plate is moved to the left, and this control will also be described.

It will be seen that the unpopped corn is stored in an air-tight container so that vital moisture, essential to proper popping, can be retained. Metered quantities are taken directly from the main body of corn and dropped into the rotating hopper. In addition, the storage area is out of the direct heat of the oven.

*The heating oven and rotating basket*

The heating oven shown generally at 52 in FIGURE 2 is illustrated also in FIGURES 4 and 8. The oven has vertical sides 180 which taper off at 182 to a level top 184. The oven rests on a frame member 122 which supports also the bottom flange of the plate 120 directly behind the oven. The top wall 184 of the oven is lined with insulation 186 retained by an inner top wall 188. The rear wall 190 of the oven has an insulation plate 192 and a relatively large circular opening 194 is provided in the rear plate to receive the rotating basket 80. A forward wall 196 of the oven has an insulation lining 198 and is provided with a central opening 200 and also with a slot opening 201 lying directly adjacent the bottom of the oven and admitting air to the interior of the oven. This slot also permits cleaning of the bottom of the oven. The insulation can be any standard type of suitable, non-inflammable material which has a high heat insulating characteristic.

The interior of the oven is preferably lined with metal and positioned between the back and front plates. On each side of the basket opening spaced from the walls of the oven are baffle plates 202 and 204 preferably having a dull, black, oxided finish on both sides. The plates are shaped to lie in each lower corner of the oven as shown in FIGURE 8. These plates serve as flow baffles when the basket is stopped but also in some way assist in maintaining a suitable popping temperature during operation. The space between the plates 202 and 204 and the walls of the oven is opened and lying in this space are two electrical heating elements 206 extending between the front and back walls of the oven behind the arcuate plates. It will be noted that the heating elements 206 do not block the flow of air between the walls of the oven and the plates. The inner lining of the oven, shown at 208, underlies the top and side walls and is separated from them by suitable insulation filling and this inner lining is spaced from the shaped plates 202 and 204 as shown best in FIGURE 8. Thus, air can circulate behind the plates 202 and 204 up around the basket 80 and yet the heating elements are shielded from the basket to prevent any real hot spot in the oven area. These plates have the main central portion at about a 65° angle to horizontal which in the embodiment shown directs absorbed heat at the unpopped corn in the rotating basket. Lines normal to the plate should focus substantially at the lower part of the basket. The bottom plate of the oven, shown at 210, is spaced from the supporting bottom plate 212 which rests on the frame member 122, and the space between these parts again is filled with insulation.

Power reaches the electrical heating units through suitable lead wires 214.

The basic mounting for the rotatable basket 80 in the oven 52 is actually on vertical plate 120 previously referred to. When viewed in FIGURE 7, it will be seen that the hopper chute 138 is a casting with side flanges 220 which are bolted to the plate 120 on either side of an opening 222. The cast housing 138 also has a sleeve extension 224 which passes through the hole 222 and extends to a position just short of the back panel 190 of the oven. Mounted in this extension 224 is a cylindrical insert 226 with a flange 228 which serves to locate a ball bearing assembly 230 between the end of the collar 224 and the flange around the end of the cylindrical insert 226. A small set screw 232 locks the cylinder 226 in position, and it will be seen that the cylinder has an angled passage 234 which leads from the bottom of the hopper 138 to the interior of the basket 80. The basket mount consists of a cylindrical casting 236 which is supported on the bearing 230 and this casting has mounted on its back face a ring shaped sprocket 238 meshing with a drive chain 240 which also passes over a sprocket 242 (FIGURE 6) mounted on a shaft 244.

The basket 80 itself is formed of an annular back plate 246 having a re-entrant portion formed by two axial flanges 248 and 250. A similarly formed annular front plate 252 is fastened to the back plate by long screws 254 with suitable tubular spacers 256 (FIGURE 5) to form the frame work of the basket. Disposed around the outside of the basket is a cylindrical sheet of screen 258.

Thus, the main basket configuration is formed by the front and back flanges and the exterior screen. Supplemental structure of the basket within the screen consists of a perforated plate 260 which, as shown in FIGURE 8, joins the periphery of the basket at 262 and is fastened there. This plate 260 is formed for a certain distance in a tangential line to an inner circle of the basket which is approximately that of the position of the screws 254 and then the plate moves more or less circularly to a point 264. The plate 260 has relatively large openings 266 which are oval in configuration being of a size large enough to retain popped kernels of corn while permitting unpopped kernels to pass through. Joined to the end 264 of plate 260 is a second curved plate 270 which is shaped in substantially conical form having numerous relatively small perforations 272. This plate joins to the back panel at the point 264 and the back edge gradually sweeps to the front of the basket to a point 274, the front edge of the apertured plate or screen 270 being more or less circular. A segmental shape 276 remains on the inside of the front panel 252 extending radially into an opening 278 of the front panel. A layout of plate 260 and plate 270 is shown in FIGURE 19.

It will thus be seen that unpopped corn passing from the hopper 138 through the passage 234 will fall into the interior of the basket and will pass through the plate 260 where it is retained by the outer screen 258. Rotation of the basket in the forward direction, that is, counterclockwise as viewed in FIGURE 8, will cause this corn to be picked up on each revolution by the plate 260. If it is popped, it will be retained by the plate 260 and fed to the outlet funnel formed by screen 270. If it is unpopped, it will again pass through the plate 260 to the outer screen and be subject to the popping heat.

The mechanism and circuit for rotating the basket 80 will be described in detail below. The oven design above described is, however, so constructed that even if the rotating basket should stop at any point in the popping cycle from the time that the raw corn is dumped into it to the final popping stage, the heat in the oven is such that it will not burn the unpopped corn or cause any of the corn to reach a temperature where it will start to smoke. Air enters an opening 201 in the front of the oven at the bottom and passes up around the basket as well as behind the baffle plates 202 and 204 to carry off excessive heat to the top of the oven. Air can pass through opening 234 and hopper 138 as well as out the front and back openings of the oven. The thermostats, of course, are still operating as long as power is furnished to the oven to limit the top heat. It is important also that all of the elements of the walls of the basket be perforated as described so that air can pass through the basket and not be reflected back to the corn by any solid walls extending axially of the basket. In addition, the coating and the spacing of the baffle plates is a factor in controlling excessive heat reaching the basket when the basket is not rotating.

As shown in FIGURES 4 and 6, a segmental cam ring 290 is bolted to a portion of the periphery of the plate 246 and this cam ring has a blunt end 292 and a tapered end 294 which cooperates with an actuating arm 296 pivoted on shaft 154 previously referred to. The basket is driven by a motor 300 mounted on the back of plate 120, this motor driving the shaft 244 which carries the gear 242. The motor is reversible and suitably connected to a circuit to be described.

As the parts are viewed in FIGURE 6, the full line view of the arm 296 is such that, upon forward, that is, counterclockwise rotation of the basket, the cam 290 will simply kick the lever arm slightly to the left and this has no effect on the system with the exception, that looking at FIGURE 7, the arm 152 and the link 156 are pulled slightly to the right without affecting the position of the shuttle plate 137. Shaft 154 mounted on a U-shaped bracket 302 carries also a short lever 304 with a foot portion 306 which is in the path of the arm 296. Positioned adjacent the arm 304 is a reversing switch 308 which has an actuating arm 310. When the motor 300 is reversed by the controlling circuit to be described, the cam surface 294 will pick up the lever 296 and move it to the right as shown in the dotted lines in FIGURE 6. This motion pushes the link 156 and the metering shuttle plate 137, dumping a quantity of corn into the hopper 138 through the opening 136. After the cam 290 has cleared the arm 296, it will fly downwardly through the action of gravity as well as the return spring 150 and the arm 304 will flip to the left to actuate the reversing switch arm 310 to cause the basket to move again in the forward direction which is counterclockwise.

On the front panel 252 extending outwardly, axially and radially, is a rod 311 which serves to push jammed corn away from the basket.

*The storage hopper for popped corn*

The rotor 80 discharges to the front of the oven, as viewed in FIGURE 2, directly behind the transparent window 34 so that popped corn issuing from the rotating basket will be visible through the window. In front of the oven 52 are two flared plates 320 secured at their back edges to the front plate 196 of the oven. A portion of these plates normal to the face of the oven is angled downwardly and inwardly to lead to a bottom chute 322. In one wall of the right-hand plate 320, as viewed in FIGURE 8, is an opening 324 through which projects a switch finger 326 extending from an overfill switch box 328. The function of this switch 328, which prevents overfill, will be described in connection with the operation of the controlling circuit. It is actuated by rod 311 pushing on accumulated popped corn in the chute formed by plates 320.

In this same location on the front wall of the oven is a mounting bracket 330 which carries a thermo-couple or disc-type thermostat 332 exposed to interior of the oven to permit proper control of the heat, this control thermostat having lead wires 334. The side plates 320 are preferably located on a front plate 336 which is held on the front of the oven by screws 338 so that the entire assembly can be removed for cleaning. The side plates 320 are flared outwardly in side wings 340.

The chute 322 opens over and discharges into the front portion of a storage bin 54, this bin being suspended upon frame member 122 by supporting tabs 350. The bin 54 has a front plate 352 (FIGURE 9) angling down from the front of the cabinet where it narrows into a short flange 354. The back plate of the bin 54 has a vertical top section 356 which tapers into a section 358 which again narrows into a depending short flange 360 paralleling the flange 354. The side walls of the bin include a flat lefthand side wall 364, as viewed in FIGURES 2 and 8, a front upper wall 366 which angles downwardly in a completing section 368, all of these walls terminating in a rectangular bottom opening.

It will be seen that there are stirring fingers in this bin mounted on a shaft 370 and driven through a small motor 372 and reduction gear assembly 373. Fingers 374, spaced along the bin, rotate in a direction to move the popped corn toward the back of the bin. This device operates when the popping basket rotates. Also, a surface paddle, having radial fingers 376 mounted on a small disc 378, is rotatably supported on the wall 368 and driven by a motor 380 and a reduction assembly 381, mounted on the outside of wall 368. This device operates during the vending of popped corn.

At the rear top of the bin 54 is a paddle shaft 382 mounted transversely of the bin 54 in the side walls carrying a paddle arm 384 with a paddle plate 386 at the end. The bin 54 is closed by a top 390 with the exception of a suitable aperture for receiving the chute 322. In FIGURES 4 and 10, the actuation of this paddle arm, through the shaft 382, is illustrated. On the paddle arm is a short lever 392 which is urged to its upward position with the paddle down by a spring 394. This lever 392 is connected by a link 396, to the extending end 398 of an armature 400 in electrical solenoid 402.

Also mounted adjacent the end of the shaft 382 is a switch arm 404 which in its arcuate movement can influence the position of a switch lever 406 on a repeat cycle switch 408 and a switch arm 410 on a sold-out switch 412. The operation of the solenoid and the switches will be described in connection with the operation of the device but the primary purpose of the paddle plate is to feel the quantity of popped corn in the bin 54 and to make proper response in the apparatus, depending on this quantity of popped corn. Switch 408 can also be referred to as a product level switch and switch 412 can operate in the cycle to reject coins until popped corn is available again. The paddle arm is raised and dropped near the end of each cycle so that it will always drop back to the top level of the popped corn in the storage bin.

*Metering and dispensing mechanism for popped corn*

Extending transversely of the general housing and resting on a frame member 420 is a transverse rectangular box 56 which underlies the bottom of the container 54 and by suitable flanges 422 (FIGURE 11) is registered with the opening at the bottom of this container. Directly beneath the bottom of the container 54, there is an opening 423 in the top wall 424 of the box 56, this box actually being open at each end. The box 56 has side walls 426 which terminate at the bottom in inturned flanges 428 projecting toward each other and forming a track at the bottom of the box. The box has outturned flanges 430 (FIGURE 9) which serve to anchor it properly on frame member 420, and the inturned flanges 428 are interrupted at the left-hand end of the box, terminating at 432. The walls of the box at this point are slightly recessed at 434.

Supported transversely of the opening 423 is a rod 436 suitably received in notches in side flanges adjacent the top of the box. This rod supports a flapper plate 440 which depends into the box 56 and projects almost to the bottom of the box. The rod 436 has an arm 442 which extends at an angle as shown in FIGURE 12 and is restrained by a coil tension spring 444 anchored to a small L-shaped bracket 446 having one wall 448 welded to the side of the box. On the end of the arm 442 is a small L-shaped bracket 450 having a leg 452 which threadingly carries a screw 454 positioned to contact the plate 446.

It will be seen that the adjustment of the screw 454, relative to the plate 452, will determine the position of the flapper plate 440. Positioned in the right-hand end of the box 56 as illustrated in FIGURE 11 is a plunger box 456. This box consists of a forward wall 458, a top wall 460 and side walls 462. The edges of the side walls are inturned slightly (FIGURE 9) to serve as bearing surfaces as the box slides back and forth on the inturned flanges 428. A yoke composed of two members 464 is joined by a cross bolt 466 which pivots a link 468 connected to an actuating arm 470 pivoted at 472 on a mounting plate 474 which is suitably supported on the frame 420.

On the back of the plate 474 is mounted a drive motor 476 which drives a shaft 478 on which is mounted a revolving arm 480 having a roller 482 which reciprocates in a slot 484 in the arm 470. The arm 470 is positioned more or less centrally of the box 56 so that it may operate between the two side flanges 428. One extreme throw to the right is shown in the full lines in FIGURE 11 and an extreme left-hand throw is shown in the dotted lines.

It will be seen that in the extreme left-hand throw, the dotted lines show the plunger face 458 as advanced considerably past the opening in the top of the box. Also, in dotted lines in FIGURE 11, the flapper plate 440 is shown in a position parallel with the top 424 of the box when the plunger box 456 is shifted to the left to its complete stroke.

It will be appreciated now that a quantity of popped corn cascading down from the hopper or storage container 54 will fill the space between the plate 440 and the leading face 458 of the box 456. Here it will be retained in metered quantity, depending on the adjusted position of the plate 440. Upon actuation of the dispensing motor 476, however, the plunger box 456 will move to the left pushing the popped corn with it and lifting the flap 440 so that the popped corn may dump through the bottom of the box into a chute 490 which is positioned directly below the left-hand end of box 56 to receive the metered popcorn.

It will be noticed in FIGURE 11 that the throw arm 480 has an end 492 which, as it revolves, actuates switch arm 494 of a switch 496. The metering chamber above described is preferably heated so that dispensed popcorn will be warm. This is accomplished by a heater housing unit 498 (FIGURE 9) containing a suitable heating element controlled by a suitable power source. The heater element is supported underneath the metering chamber by a U-shaped yoke having a bottom plate 500 which actually forms the bottom of the metering chamber, this yoke having side walls 502 which flare at 504 up along the walls of the containing hopper 54.

*The dispensing station and accessories*

The chute 490, above referred to, which receives the metering quantity of popped corn, is supported in a larger hopper-like unit 58 which is suspended from member 420 at the bottom of the unit. This shell 58 has opening 510 through which the cup 66 can be seen, and it is also open at the bottom so that it dumps into a removable container 60. A sectional view of the lower portion of the shell 58 is shown in FIGURE 3 where cross wires 512 serve to support the bottom of a cup. The supply of liquid oil for the popped corn is found in the bottle-like container 62 which has an outlet tube 514 (FIGURE 2) leading to an oil pump shown diagrammatically at 516. This oil will be heated by a small resistance heater 532 and delivered to an outlet tube 518 which overlies the cup 66 in position to receive corn.

The salt dispenser 64 is directly above the cup 66 in its readied position, and suitable dispensing mechanism is associated with the salt container so that it will direct salt at multiple intervals into the popcorn as it is filling the cup. The cup dispenser 68 is of standard construction and consists of a wire rack (not shown) of cups which rotates and dispenses in a standard way. This wire rack is driven by a motor 519 shown in the circuit diagram which drives a reduction gear set in housing 520 out of which extends a driving shaft 530. As previously indicated, the cup dispensing device operates four cams in a cam set 70.

Thus, to describe generally the dispensing operation, a metered quantity of popped corn in the metering chamber ahead of the plunger 456 will be awaiting a dispensing signal, and it will be heated by the heating unit 498. Actuation of the motor 476 in the circuit will cause the plunger box 456 to move to the left, discharging popped corn into the chute 490 where it tumbles into the awaiting receptacle 66. At the same time, and during this discharge, oil is pumped in several spurts from the container 62 and salt is dispensed in multiple spurts in desired quantities into the corn which is dumping into the container.

It will be noted that in FIGURE 2, a door switch 532 is provided and a coin return unit 534 which is actually on the door is shown. Similarly, the receptacle 536 for the coin-actuated mechanism having a coin chute 537 on door 30 is shown in FIGURE 2, and a timer box 538 is shown at the left of the container hopper 54.

*The control circuit and the mechanism for the operation*

In FIGURES 13 to 16, the control devices and operating circuits for the previously described apparatus are illustrated. In FIGURE 15, a gear box 520 for the cup dispensing mechanism carries on the shaft 530 four adjustable cams, each formed of split plates so that they may be adjusted relative to each other to vary certain peripheral gaps. These cams are designed respectively as 551, 552, 553 and 554 and each controls respectively a switch I, II, III and IV. Each switch has a follower arm 561, 562, 563 and 564. It will be noted that the cup motor cam 551 has a fairly wide gap extending over a little less than 50 percent of the cam. A gap in cam 552 is about 50°. The gap in cam 553 is about 30° and cam 554 has three gaps so that the oil and salt controlled by this cam will be given at least three shots instead of just one.

Reference is made to FIGURE 13. It will be seen that the circuit diagram for purposes of explanation is set up with a line wire on each side of the sheet on which the figure appears with the various elements in the circuit located between these wires and various points along the left-hand side of the drawing have been marked alphabetically from A to R to facilitate reference to this circuit. When the two lines 566 and 568 are connected up to a source of power by plugging in a standard plug, and when the door switch 532 is closed by the closing of the door 30, this throws a fuse 570 into the circuit and also a high limit temperature thermostat 572 for overload protection as found at point A in the drawing (FIGURE 13).

Progressing downwardly, it will be seen that at point B of the drawing, the product heater 498 is in the circuit at all times when the machine is plugged in. Similarly, at point C, it will be seen that there is a lamp 574 which illuminates certain portions of the machine at all times. At point D in the circuit is found an oil heater 576 which is positioned below the oil container 62 to keep it warm.

Between points E and F, on FIGURE 13, are diagrammatically illustrated devices controlled by the cam switches illustrated by I, II, III and IV of FIGURES 15, 16, the cams being designated by

|C|

It will be seen that the switch II, controlled by cam 552 directly above the point F on the circuit, controls the product vending motor 476 and also in this line is the limit switch 496 shown in FIGURE 11 of the drawings. Between the points E and F is a line containing the cup motor 519 and associated with this line is the positive vend cam 553 controlling switch III which insures completion of the vend cycle. A parallel circuit includes the stir motor 380 at point J in the circuit of FIGURE 13.

It will be seen, however, that this portion of the circuit connects to line 568 through a point S on the right-hand side of the drawing connected to the coin meter which operates in the presence of a coin to close a start relay 578 controlling switches RA, RB, RC in FIGURE 13. Insertion of a coin momentarily closes a coin switch CS at the coin meter, establishing a circuit from the point S through contact 3 of the coin switch, energizing the coil 578 which closes the contacts of the triple pole start relay and completing the circuit to line 568.

Closing the RA contact of the relay establishes a holding circuit for the relay coil through the cam switch III on the cup vending shaft 530. Since the coin switch contact was momentary, that is, "make and break," the upper leg of the circuit to the relay coil is now interrupted at the coin switch. The RB contacts of the start relay start the cup vending motor 519 and the RC contacts of the start relay operate the probe solenoid 402 which connects at point M on the left-hand side of the circuit. Rotation of the cup vending motor causes a cup to drop from a suitable stack in the cup vending unit to be available in the dispensing station to receive the product.

After a short period of rotation, the cam 553 on the motor shaft causes the cam switch III to snap over to its other position. This breaks the holding circuit to the start relay coil at the same time breaking all start relay contacts and the circuits to the cup vending motor and the probe solenoid. However, cam switch III in its new position makes a circuit directly to the cup vending motor and it will continue to run until the circuit is broken by cam switch III at the end of the vending cycle, about 10 seconds.

After the cup drops during the vend cycle, cam 552 at switch II closes the circuit starting the product vend motor 476, the limit switch 496 being open at this stage. As motor 476 rotates, it actuates the slide or product plunger 456 which moves the product in the metering chamber against the valve plate 440 lifting the valve plate and sending the product through the chute 490 to the cup 66. A cam 492 on the vend motor shaft 478 (FIGURE 11) moves away from the limit switch arm 494, allowing it to close the switch 496 in the circuit which will continue to operate the motor 476 directly after cam 552 at switch II breaks the circuit, and this continues until the cam 492 again contacts the limit switch arm 494 after one full revolution. Cam 551 at switch I insures completion of the vend cycle should either supply hopper switch 412 or no-cup switch 592 drop out during a vend cycle. Following this, cam 554 closes switch IV on three occasions to operate the solenoids 580 and 582 which actuate the discharge of the salt and the oil into the product entering the awaiting cup 66; following this, the vend cycle is ended by cam 551 acting on switch I. It will be seen that at the station K in FIGURE 13, a counter 584 is connected to the circuit with start relay switch RC.

The above operation assumes, of course, that the cup dispenser is fully loaded and a suitable switch 592 is provided to indicate an empty cup dispenser. It also assumes that there is sufficient popped corn in the hopper 54 as sensed by the probe arm 384 and empty hopper switch 412. Each time a coin is inserted, product is vended which lowers the level of the product in the storage hopper.

Because a predetermined time is required to pop corn, it is necessary to have a timed relationship on a number of the operating portions of the circuit. To accomplish this, a timer motor 586 is connected in series with a low limit switch 408 at point N (FIGURE 13). Limit switch 408 is closed when the level of popped corn is low to start the popper to replenish the popped corn. Motor 586 controls a series of cam switches 15, 16 and 17. This mechanism is contained in the timer box 538 of FIGURE 2 and the sequence will be described.

At the beginning of each cycle when a coin is dropped and start relay 578 is actuated, the probe solenoid 402 is energized through relay switch RC. Also, once near the end of each cycle, the timer cam 16 energizes the probe solenoid 402 through actuation of timer switch 16. This lifts the sensing arm 384 and paddle 386 above the level of the product in the hopper 54. If this arm 384 drops to a product low position wherein the switch 408 is closed (see right-hand portion of circuit at T, FIGURE 13), this will start a cycle wherein corn is continuously popped until this switch 408 again attains the open and full position. Since the vending cycle is much shorter than the popping cycle, it is obvious that customers can deplete the storage hopper of product faster than the popping cycle can replenish it.

If the product is removed at an unreasonably fast rate because of repeated vendings, the sensing paddle 386 will finally drop to the point that the empty hopper or sold-out switch 412 will light the sold-out lamp 590 back at station G on the circuit of FIGURE 13. Note also the no-cup switch 592 in this line which could operate the sold-out lamp, and this will cause the return of any coins which were inserted after this point. However, the machine will continue to function in the repeat cycle as long as there is corn available for popping and will fill the storage hopper, turning off the sold-out lamp when there is again sufficient product to vend and will continue to repeat the popping cycle until the sensing arm 384 reaches the full switch position, it being actuated by the probe solenoid, as previously indicated, at the end of each timer cycle.

If the raw corn supply is completely exhausted, the popping basket motor, the operation of which will be immediately described, will function in the repeat cycle until the machine is serviced or disconnected.

At the start of a replenishment cycle, the timer motor 586 activates the popping basket motor 300 in a reverse direction (lower right-hand of FIGURE 13), completing the circuit from the point Q on line 566 through timer switch 17 to the motor relay switch 600 and through a pre-heat circuit, to be described, to the reverse coil of the motor.

As shown in FIGURE 14, the basket motor circuit has a forward and a reverse point on the basket motor and through the timer switch. Power reaches the reverse side of the motor through the motor relay switch 600, the chute overload switch 328, and a pre-heat relay switch to be later described. This condition continues until the reverse limit switch 308 closes in a manner previously described, by action of dropping lever 296 (FIGURE 6).

Then, the motor relay solenoid moves the relay switch 600 to the dotted line position and the motor now runs forward until the timer switch opens. The forward circuit through switch 600 also holds the motor relay circuit since closing of reverse switch 308 is momentary. Of course, if either the pre-heat relay switch or the chute overload switch 328 is open, the cycle will not start. The reverse limit switch 308 is actuated as shown in FIGURE 6 by the falling back of the lever 296 after a certain predetermined reverse motion, this lever kicking the lever 304 which hits the reverse limit switch arm 310. The basket then starts rotating in the forward direction, and this, in addition, actuates the slide shuttle plate 137 through the arm 154 dumping a certain metered quantity of unpopped corn into the chute 138 from which it reaches the inside of the rotating hopper. The motor then continues to operate in the forward direction until the cycle is completed by the timer and switch 17 opens. During this period, corn has popped in the rotating basket and discharged into the storage hopper.

At the close of each timing cycle, the timer switch 17 is actuated causing the probe arm 384 to rise above the level of popped corn in the hopper. If the corn prevents dropping of the arm to the point that product low switch is actuated, the popping cycle will stop. A timer switch 15 serves as a holding switch for the timer motor so that it may complete its cycle, once it has started.

The motor 372 on the right-hand side of the product storage hopper (FIGURE 8), also energized by timer switch 17, rotates at all times that the popping basket is in operation. Another motor 380, referred to as a positive vend motor, on the lower right-hand side of the storage hopper (FIGURE 8) turns a mixing wheel in the hopper only during the vend cycle.

If for some reason popped corn fills hopper 54 and piles up in the chute between plates 320, the chute overload switch arm 326 (FIGURE 8) will be actuated by rod 311 pushing corn against it, thus opening chute overload switch 328 in the motor relay circuit and preventing further corn from being delivered to the basket.

The oven heating circuit is shown at stations O and P on FIGURE 13. When the machine is plugged into a power source, heater relay HR is energized assuming that the thermostat 332 is cold and closed. Energization of relay HR closes switch HC connecting oven resistance elements 206 into the circuit.

A pre-heat system is also incorporated to insure an oven temperature capable of popping corn before any timing cycle is started. It usually requires 10 to 20 minutes pre-heat. After the pre-heat, the thermostat 332 will cause the heaters to cycle off and on to maintain a proper temperature range.

The basket will rotate in a counterclockwise direction during this pre-heat period if the product is in low or sold-out position. However, it will not load raw corn until the oven reaches proper temperature and the thermostat makes its first cycle to the heater off position.

This automatic pre-heat feature prevents double loading of the popping basket in the event of any interruption of the main power supply and the door may be opened or closed at any time and the machine will resume normal operation. The machine will operate in repeat cycles popping approximately two cups of corn each cycle, which has been found can be approximately six minutes, until the storage hopper is filled. When the product is vended sufficiently to lower the level in the storage hopper 54, the sensing arm 384 will automatically start the popping cycle which will run until the hopper reaches full position.

As shown in FIGURE 13 (lower left) a pre-heat relay is connected at R to line 566. The purpose is to keep the basket motor running in a forward direction only until the thermostat 332 has cycled. This prevents loading of corn into the basket until proper temperature is reached.

Reverting to the instant that the machine is connected to a source of power, the closed thermostat 332 actuates heater relay HR closing HC and putting oven resistance elements 206 into the circuit. Contact HA closes circuit from line 568 through pre-heat relay switch PHA to the forward winding of motor 300 and this also energizes the coil of the motor relay.

With motor relay energized, and product level switch 408 in "full" or open position, the timer motor 586 will not run. As the thermostat opens, switch HA opens the circuit to the motor relay coil. The basket motor will thus run alternately forward and stop as the thermostat cycles on and off.

The first time that the thermostat opens, indicating the oven has reached a desired temperature, the pre-heat relay coil is energized through contacts in the heater relay and the motor relay. This completes a holding circuit to the pre-heat relay coil through its own contact PHC. At the same time, contact PHB sets up to the reverse winding. The pre-heat relay will now remain continuously energized until main current is interrupted. The cycling of the machine will now proceed normally.

In FIGURE 20 is found a time layout which illustrates the relationship between the timer cam switches and the operation of the timer motor 586, the probe or product level solenoid 402, the basket motor 300, and the product mix motor 372.

When the machine is idle, i.e., the product storage hopper full, it may be desirable to provide action by starting the popping basket with the insertion of a coin. In this case, the basket should only receive sufficient raw corn to "pop" one cup to replenish the one being vended. At the same time, if the product storage is depleted through repeated vendings, it is desirable to replenish the supply as quickly as possible. This is accomplished by loading two times when the level arm senses a low supply.

In FIGURE 21, a modified portion of the circuit to accomplish this is shown as an alternative to the circuit of FIGURE 13. This circuit shows the product low switch 408 and an associated repeat switch 408A. These are related to timer cam switches 15, 16A, 16B, 17A and 17B.

With the product switch 408 in full position, the timer cycle is started only by insertion of a coin which would energize the Start Relay as before and provide current through switch 16B to the timer motor. After the timer motor has started a timer cam at switch 15 would provide a direct circuit to the timer motor and contact can break at switch 16B.

Shortly thereafter, both timer switches 17A and 17B would make contact at MIX and BM. With the product level switch in full position, current is directed to the basket motor. This would give a single loading of corn and the timer will cycle once. If Product Switch 408 is in the low position, however, current is directed through the "Low" contact to PLS at switch 17B and thence to the basket motor, and the basket would load two times each timer cycle. Product mix motor is not cut out of the circuit with this arrangement.

Under these conditions, in order to energize the timer motor to obtain a repeat load cycle, a second switch 408A is placed in the circuit to be operated by the Product Low lever and thus a double-pole, double-throw switch is advantageously used.

In FIGURE 22, a modified time layout diagram utilizing the circuit elements of FIGURE 21 is shown.

I claim:

1. In an apparatus for the automatic popping of popcorn including a housing, a basket supported for rotation in said housing having an inlet for unpopped corn and a discharge opening for popped corn, a supply bin for unpopped corn, a transfer means for transmitting unpopped corn from said supply bin to said basket and metering means for discharging a measured quantity of unpopped corn to said transfer means, that improvement which comprises a product hopper located relative to said basket so that popped corn can move into the hopper by the action of gravity, and means below said product hopper for discharging a metered quantity of product comprising:
    (a) means forming a passage having a product receiving opening on one side and a product discharging opening on another side spaced longitudinally,
    (b) a plunger in said passage movable to close the product receiving opening in said hopper,
    (c) a gate pivotally mounted at a fixed point in said passage between said openings movable from a first position to a second position in said passage and, in the first position, spaced from said plunger in its retracted position to define a receiving chamber for a product, and
    (d) power means adapted to move said plunger and a metered quantity of product against said gate to shift said gate to the second position to allow said product to pass said gate and through the product discharge opening in said passage to a dispensing station.

2. A device as defined in claim 1 in which said power means comprises:
    (a) a motor,
    (b) a cam driven in a circular path by said motor,
    (c) a lever pivoted at one end adjacent said motor and at the other end to said plunger, said lever having a slot for receiving said cam, and
    (d) limit switch means mounted adjacent said cam operable from an open to a closed position at the beginning of the rotation of said cam and operable from a closed to an open position at the completion of the rotation of said cam in a 360° cycle.

3. A device as defined in claim 1 in which said power means includes in a control circuit a starting switch to initiate the movement of said motor, and a normally open limit switch being utilized in its closed position after the initial movement of said motor to continue the cycle of the product discharging means.

4. A device as defined in claim 1 in which said gate has a controlling arm associated therewith, means for resiliently biasing said arm to urge said gate to the first position, and adjustable means for limiting the position of said arm in the first position relative to said plunger to define a metering chamber for measuring a quantity of product to be discharged.

5. A corn popping and dispensing machine comprising:
    (a) a storage supply of unpopped corn,
    (b) a popping mechanism for metered quantities of corn from said supply,
    (c) means for delivering metered quantities of corn to said popping mechanism from said supply,
    (d) a product hopper for receiving popped corn from said popping mechanism,
    (e) means to sense the quantity of product in said hopper, and
    (f) means responsive to said sensing device for actuating said means for delivering corn in double quantities to said popping mechanism in response to a predetermined low quantity of product in said hopper.

6. A device as defined in claim 5 in which said popping mechanism includes a heating oven and means for heating said oven, and a control circuit for said heating means and said means for delivering corn to said mechanism upon said heating oven reaching a predetermined temperature.

7. In an apparatus for the automatic popping of popcorn including a housing, a basket supported for rotation in said housing having an inlet for unpopped corn and a discharge opening for popped corn, a supply bin for unpopped corn, a transfer means for transmitting unpopped corn from said supply bin to said basket and metering means for discharging a measured quantity of unpopped corn to said transfer means, that improvement in the metering means which comprises
    (a) a valve at the bottom of said supply bin having an opening over said transfer means,
    (b) lever means for actuating said valve to an open position to allow corn to dump directly into said transfer means, and
    (c) cam means rotatable with said basket for moving said lever means in response to one direction only of rotation of said basket to time the open period of said valve and thus meter the amount of corn disposed to said transfer means.

8. In an apparatus for the automatic popping of popcorn including a housing, a basket supported for rotation in said housing having an inlet for unpopped corn and a discharge opening for popped corn, a supply bin for unpopped corn, a transfer means for transmitting unpopped corn from said supply bin to said basket and metering means for discharging a measured quantity of unpopped corn to said transfer means, that improvement in the means for supporting the basket for rotation in said housing which comprises
  (a) a vertical plate supported in said housing having a horizontal flange at the top thereof,
  (b) means on said flange for removably supporting said supply bin, said flange having an opening therein for passing unpopped corn, said transfer means being mounted on said plate and comprising:
  (c) a chute having a lateral extension thereon at the bottom end forming a hub, said chute having a bottom opening extending into an internal passage through said hub which mounts through an opening in said plate, said hub serving as a rotatable support for said basket, said chute being positioned below the hole in said flange to receive unpopped corn from said bin and pass it through said hub to the interior of said basket regardless of the rotative position of said basket.

9. In an apparatus for the automatic popping of popcorn including a heating circuit, a rotating basket mounted for forward and reverse rotation, a supply of unpopped corn, and metering means for delivering, intermittently, a supply of unpopped corn to said basket, that improvement which includes operating means for said metering means comprising:
  (a) a valve gate,
  (b) a lever for operating said gate pivotally suspended adjacent a portion of said rotating basket,
  (c) a cam on said basket positioned to engage and pivot said lever through a predetermined arc from an at-rest position when said basket is rotating in reverse direction only, said lever being released by said cam at the end of said arc to fall free to its at-rest position,
  (d) an electric motor and control circuit for actuating said basket, and
  (e) a switch in said circuit positioned adjacent the at-rest position of said lever to be actuated by the falling motion thereof to reverse the direction of rotation of said basket into a forward rotation for popping corn.

10. A system for popping and dispensing popcorn automatically in response to coin insertion and the like which comprises
  (a) a corn supply,
  (b) a basket mounted for rotation in a forward and reverse direction,
  (c) an oven for enclosing said basket to heat it to a popping temperature,
  (d) metering means responsive to rotation of said basket in a reverse direction to meter a specific quantity of corn per revolution of said basket from said supply to said basket,
  (e) a means to effect forward rotation of said basket in a popping cycle subsequent to the action of said metering means,
  (f) a product hopper for receiving popped corn from said basket, and
  (g) means responsive to product level in said product hopper associated with said means to rotate said basket to effect a single reverse revolution of said basket when said product level is above a predetermined point and to effect a multiple reverse revolution of said basket when said product level is below said predetermined point.

11. In an apparatus for the automatic popping of popcorn including a housing, a basket supported for rotation in said housing having an inlet for unpopped corn and a discharge opening for popped corn, a supply bin for unpopped corn, a transfer means for transmitting unpopped corn from said supply bin to said basket and metering means for discharging a measured quantity of unpopped corn to said transfer means, that improvement which comprises a product hopper located relative to said basket so that popped corn can move into said hopper by the action of gravity and means in the path of said movement of popped corn operable in a control circuit to interrupt the action of the basket in the event of an overload of popped corn between said basket and said product hopper, said means in the path of the movement of popped corn comprising:
  (a) a directing chute having side walls adjacent the basket opening,
  (b) a switch having an actuating finger projecting through one of said walls to lie in the path of popped corn, and
  (c) a probe rod on said basket projecting outwardly from said basket movable in a path near said finger wherein an overload of corn will be pressed against said finger by said probe rod to actuate said switch.

References Cited by the Examiner

UNITED STATES PATENTS

| | | | |
|---|---|---|---|
| 482,832 | 9/1892 | Palmer | 99—238.6 |
| 564,231 | 7/1896 | Stutsman | 99—238.6 |
| 841,969 | 1/1907 | Hodge | 99—238.6 |
| 1,001,637 | 8/1911 | Gray | 219—400 |
| 1,182,075 | 5/1916 | Bullis | 99—238.6 |
| 1,248,087 | 11/1917 | Daugherty | 99—238.6 X |
| 1,257,816 | 2/1918 | Cunningham | 222—451 X |
| 1,339,662 | 5/1920 | Morgan | 99—238.4 |
| 1,497,025 | 6/1924 | Priest | 99—238.2 X |
| 1,545,357 | 7/1925 | Schwimmer | 99/238.3 |
| 1,586,950 | 6/1926 | Hartman | 99—238.2 |
| 1,867,910 | 7/1932 | Eakins | 99/238.6 |
| 1,976,425 | 10/1934 | Young | 99—238.6 |
| 2,017,293 | 10/1935 | Priest | 99—238.2 X |
| 2,034,484 | 3/1936 | Pagendarm | 99—238.2 |
| 2,162,286 | 6/1939 | Siefert | 222/361 |
| 2,268,861 | 1/1942 | Ellis et al. | 219/389 |
| 2,369,251 | 2/1945 | Reynolds | 222/361 X |
| 2,588,535 | 3/1952 | Kahn | 68/24 X |
| 2,606,489 | 8/1952 | Morsette | 99/238.6 |
| 2,713,302 | 7/1955 | Crank | 99/238.5 |
| 2,771,836 | 11/1956 | Denehie et al. | 99/238.4 |
| 2,812,704 | 11/1957 | Hawks | 99/238.6 X |
| 2,848,937 | 8/1958 | Martin | 99/238.5 X |
| 2,983,408 | 5/1961 | Schwartz | 222—361 X |

FOREIGN PATENTS

| | | |
|---|---|---|
| 613,137 | 5/1935 | Germany. |
| 533,223 | 2/1941 | Great Britain. |
| 127,107 | 1/1950 | Sweden. |

WALTER A. SCHEEL, *Primary Examiner.*

ROBERT E. PULFREY, *Examiner.*

CLYDE I. COUGHENOUR, *Assistant Examiner.*